June 17, 1947.  M. K. INGOLDBY ET AL  2,422,197
FIRE CONTROL OR LIKE APPARATUS FOR SIMILAR PURPOSES
Filed March 19, 1942  3 Sheets-Sheet 3

Inventors
Thomas Frederick Clarke.
Percy William Cole.
Executors of Maurice
Kerr Ingoldby, deceased.
Johann Hermann Attink-Spaink
By Cameron, Kerkam + Sutton
Attorneys Patented June 17, 1947

2,422,197

UNITED STATES PATENT OFFICE 2,422,197

FIRE CONTROL OR LIKE APPARATUS FOR SIMILAR PURPOSES

Maurice Kerr Ingoldby, deceased, late of Tynemouth, England, by Thomas Frederick Clarke, Swanley, England, and Percy William Cole, Purley, England, executors, and Johann Hermann Abbink-Spaink, Jesmond, Newcastle-on-Tyne 2, England, assignors to Vickers-Armstrongs Limited, London, England, a British company Application March 19, 1942, Serial No. 435,355
In Great Britain April 21, 1938

8 Claims. (Cl. 60—53)

1

This invention relates to gun-fire control or like apparatus for similar purposes and is concerned particularly with the transmission of measured displacements to a gun whereby the latter is adjusted automatically upon its mounting. It will be clear from the following that the invention is not limited in its use to the transmission of displacements in the fire control of guns and the apparatus might well be employed for the control of searchlights or other displaceable objects.

It is the primary object of the invention to provide apparatus which will operate from a very small controlling torque such, for example, as the torque developed in the mechanism of an indicating instrument.

In accordance with the invention in gun-fire control or like apparatus there is provided apparatus for the transmission and power amplification of measured displacements from a director to an object being controlled thereby, wherein the director is arranged to control a photoelectric device in such manner that when the director is moved in one direction it allows a photo-electric element of said device to be exposed to exciting radiation whilst when the director is turned in the other direction it allows a further different photo-electric element to be exposed to exciting radiation, said photo-electric device being associated with an electric follow-up motor, the direction of operation of which is controlled according to whether the one or the other of the photo-electric elements is energised and the follow-up motor operating always in such manner as to tend to restore the photo-electric device to a state of rest whereby the electric motor follows up the movements of the director, and wherein the follow-up motor has its output applied to the control of a hydraulic pump and motor unit, the power output of which is employed for imparting the controlling movements to the controlled object. The hydraulic pump and motor unit may be of any suitable type and may be provided with suitable hunter valve gear for its control.

In order that the said invention may be clearly understood and readily carried into effect, the same will now be more fully described with reference to the accompanying drawings, in which.

2

Figure 2:
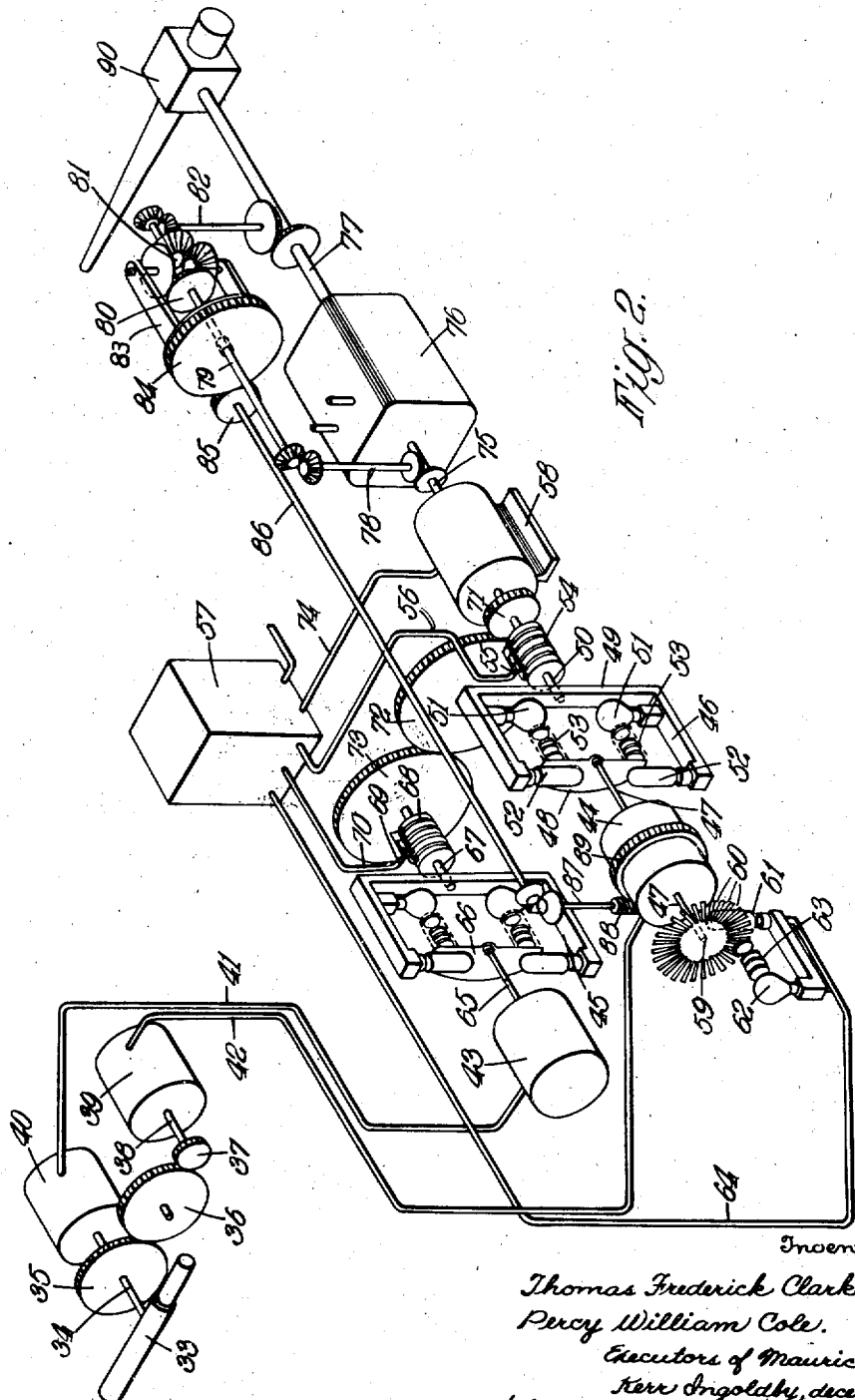
Figure 2 shows also partly diagrammatically a constructional form suitable for carrying the lay-out of Figure 1 into practice.
Figure 3:
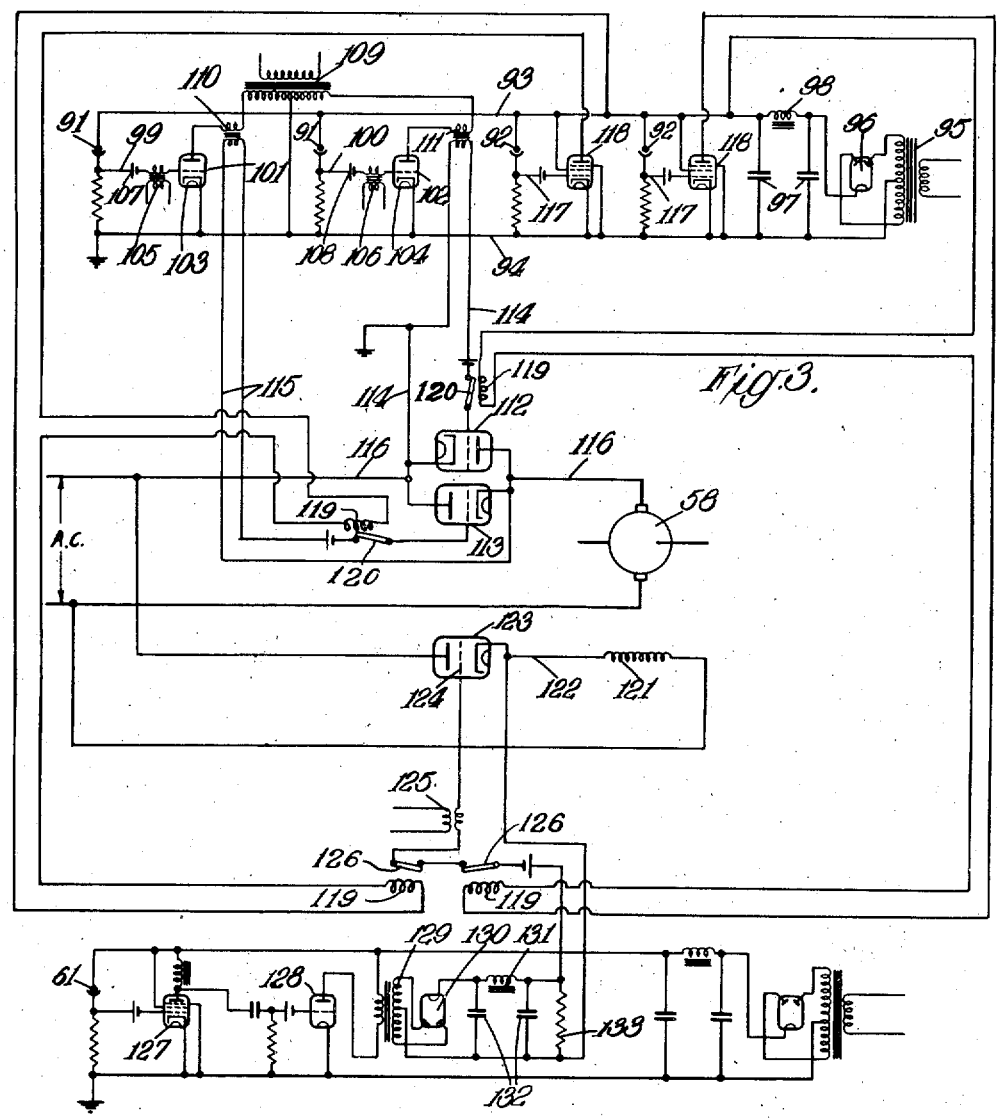

Figure 3 is an electrical diagram of an electric power amplification unit employed in the construction shown in Figure 2.

Figure 1:
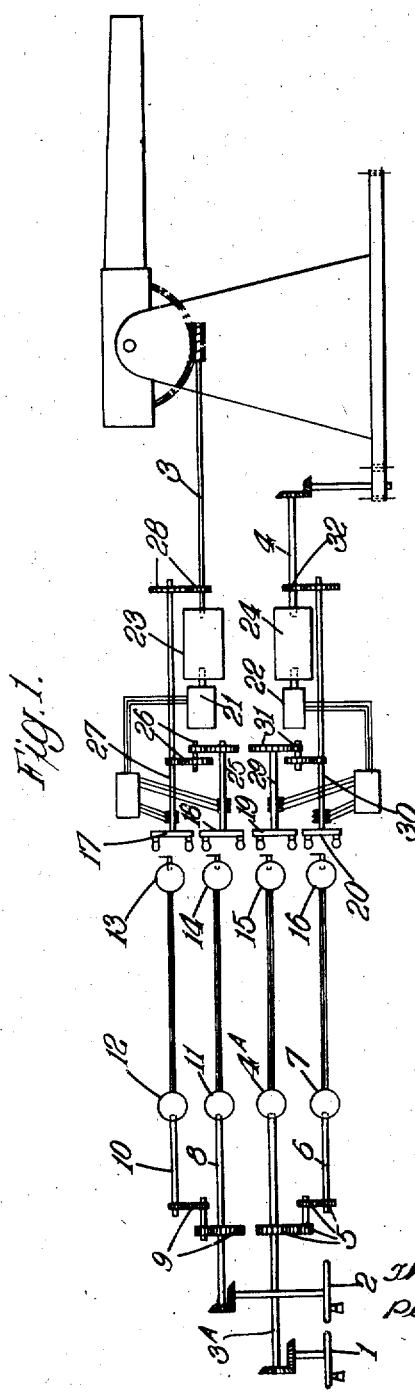
Figure 1 shows diagrammatically the lay-out of an apparatus built in accordance with the invention.

For the sake of generality, in Figure 1 there is indicated a training handwheel 1 and an elevating handwheel 2, the movements of both handwheels representing the movement that it is desired to impart to a gun mounting by means of corresponding power shafts 3 and 4. It is required that the shafts 3 and 4 have movements representing those of their corresponding handwheels 1 and 2 but that such movements of the shafts 3 and 4 should be powerful so as to accomplish the actual elevating and training movements of the gun mounting. The handwheel 1 drives through gearing to a shaft 3A which extends to a transmitter 4A. There is gearing 5 between the shaft 3A and a further shaft 6 driving a transmitter 7. The gearing 5 is such that the shaft 6 makes a plurality of revolutions for each revolution of the shaft 3A. The transmitter 7, therefore, is regarded as a "fine" transmitter and the transmitter 4A is regarded as a "coarse" transmitter. The handwheel 2, in like manner to the handwheel 1, drives onto a shaft 8 connected by gearing 9 with a shaft 10. The shafts 8 and 10 respectively drive onto coarse and fine transmitters 11 and 12. The transmitters 12, 11, 4A, and 7, are electrically connected to corresponding receivers 13, 14, 15 and 16. Photo-electric devices 17 to 20 are associated one with each of the receivers and in a manner which will be explained more particularly with reference to Figure 2, the photo-electric devices 17 and 18 controlling a follow-up motor 21, and the photo-electric devices 19 and 20 controlling a follow-up motor 22. The motor 21 operates a hydraulic pump and motor unit 23 whilst the motor 22 controls a similar unit 24. The output shafts of the units 23 and 24 are formed by the shafts 3 and 4 previously referred to.

It will be seen that the photo-electric device 18 is carried upon a shaft 25 having a geared connection 26 with a shaft 27 associated with the photo-electric device 17. The gear ratio of the gearing 26 is the same as that of the gearing 9 so that if the photo-electric devices 17 and 18 cause the shafts 27 and 25 to run following the movements of the receivers 13 and 14, then the gearing 26 will operate and the shaft 3, through its gearing 28, may run smoothly in correct relation with the shaft 27. In like manner, the shafts 29 and 30 respectively associated with the photoelectric devices 19 and 20 are connected by gearing 31 having the same gear ratio as that of the gearing 5, so that under normal conditions of operation the output shaft 4 connected by gearing 32 with the shaft 30 may run in correct relation to the latter. As will be explained hereinafter, should the fine transmissions having the photo-electric devices 17 and 20 become, for some reason, disturbed in their synchronism, then the coarse transmissions are arranged to apply the necessary corrections in order to restore the coincidence of the fine transmissions through the gearing 26 and 31.

Referring now to Figure 2, there is here shown a telescope 33 which may be regarded as equivalent to, say, the handwheel 1 of Figure 1. The telescope 33 is carried upon a shaft 34 which supports a gearwheel 35 meshing with a further gearwheel 36 which, in turn, engages with a pinion 37 on a shaft 38 of a transmitter unit 39. The latter may be of an electrical type and there is a similar transmitter unit 40 mounted upon the shaft 34. The gearing 35, 36 and 37 is such that the shaft 38 will make a plurality of revolutions for one revolution of the shaft 34. The transmitter 40 is, therefore, regarded as the "coarse" transmitter and the transmitter 39 as the "fine" transmitter. There are connections illustrated diagrammatically at 41 and 42 from the transmitters 40 and 39 respectively to receivers 43 and 44. The receiver 43 is the coarse receiver whilst the receiver 44 is the fine receiver. Each receiver is associated with a corresponding photo-electric device 45 and 46, and it will suffice here to describe only one of these devices since they are precisely similar. The receiver 44 has a shaft 47 to which there is attached a semi-circular screen 48 of opaque material. A frame 49 is supported upon a shaft 50, the latter being co-axial with the shaft 47 of the receiver 44. The frame 49 serves to support a pair of lamps 51 which are located to one side of the screen 48. Upon the other side of the screen 48 the frame supports photo-electric cells 52, suitable optical lens systems 53 being located between the lamps 51 and their respective photo-electric cells 52 so as to concentrate a beam of light from each source of light onto the corresponding photo-electric cell. The shaft 50 carries a slipring member 54 with cooperating brushes 55. Connections are made from the individual sliprings, conveniently through the shaft 50 which may be hollow, so that electric currents may be constantly supplied to the lamps 51 and also so that the output from the photo-electric cells 52 may be taken from the appropriate sliprings. The electric connections from the brushes 55 are indicated at 56 and are seen to lead to an amplifier 57. From the latter, an electric motor 58 is supplied with field and armature currents through connections indicated at 74. The arrangement of the amplifier is such that if one of the photo-electric cells 52 is energised, this causes an amplified current to flow in the armature of the motor 58 in a particular direction whereas if the other of the photoelectric cells 52 is energised, an armature current in the opposite direction is introduced in the motor 58. An energisation of one of the two photo-electric cells is brought about when the screen 48 is moved angularly. In a normal position of the apparatus, the screen 48 shields both photoelectric cells so that when the lamps 51 are in operation no light from the lamps 51 may fall upon the sensitive part of said photo-electric cells. An angular movement of the screen 48 progressively uncovers one of the cells so that progressively an increasing current flows in the armature of the motor 58, whilst the other cell remains totally screened. If there were a constant field excitation of the motor 58 the latter would run in the one direction or the other depending upon the direction in which the screen 48 has been moved and with a torque depending only on the armature current. Such a system might not be both accurate and sensitive in regard to following up the movements of the screen 48 when the screen is rapidly accelerated or decelerated. To overcome this difficulty, the shaft 47 of the receiver 44 carries a disc 59 which is radially slotted as at 60. Upon one side of the slotted disc 59 there is supported a photo-electric cell 61 and upon the other side a lamp 62 together with a suitable optical lens system 63 for concentrating the light from the lamp and focussing it onto the photo-electric cell 61. It will be understood that when the lamp 62 is in operation, the frequency with which light will fall upon the cell 61 will depend upon the speed of rotation of the disc 59. There are electric connections 64 from the photo-electric cell 61 and to the lamp 62 to supply the latter with electrical energy, and to connect the photo-electric cell to the amplifier 57. The connections 64 enter the electric amplifier unit 57. The latter is arranged so that the field current which it supplies to the motor 58 is proportional to the frequency of energisation of the photo-electric cell 61 which frequency is, of course, in turn proportional to the speed of the receiver 44.

The receiver 43 has a shaft 65 associated with the screen 66 of the photo-electric device 45. The latter has a shaft 67 and a slipring member 68 associated with brushes 69 which are joined by a connection 70 to the electric amplifier unit 57.

It will now be understood that if the telescope 33 is angularly adjusted, then for one revolution of the shaft 34 the shaft 38 will make a plurality of revolutions and similarly the fine transmitter 39 will experience a plurality of revolutions which it will communicate via the connection 42 to the fine receiver 44. The latter will cause corresponding displacement of the shaft 47 which will move the screen 48 relative to the photo-electric cells 52 so that one of the latter is exposed to the light from its respective light source 51. The current in the armature of the motor 58 will develop in a corresponding direction so that the motor tends to run and thereby shifts the frame 49 in such manner as to bring that photo-electric cell 52 which is exposed to light radiation back to a position where it is behind the screen 48 and where it is no longer subject to such radiation. In a manner previously explained, the field current in the motor 58 will depend upon the speed of operation of the receiver 44. Any rotation of the shaft 50 will be communicated to the gearwheel 71 mounted thereon, such gearwheel meshing with a further gearwheel 72 which, in turn, meshes with the gearwheel 73 mounted upon the shaft 67. The ratio as between the gearwheels 71 and 72 and 73 is the same as between the gearwheels 37, 36 and 35. The receiver 43 operates in like manner to the receiver 44 except, of course, that it has the different gear ratio drive at the transmitter end. Whilst both receivers are running in coincidence and whilst the follow-up motor 58 is in coincidence with the receiver 44, the coarse receiver 43 does no useful work. If, however the fine receiver 44 and the follow-up motor 58 should tend to get out of step, the coarse receiver 43 and its associated photoelectric device 45 takes control and resets the fine stage since the screen 66 will expose one of the photo-electric cells of the device 45. When the coarse stage of the apparatus achieves its resetting action the fine stage will continue to operate correctly within its limits of accuracy. This desired operation is secured with the aid of the electric amplifier unit which has an output connection indicated at 74, supplying the field and armature currents to the motor 58.

The motor 58 has an output shaft 75 which enters a hydraulic pump and motor unit 76. The shaft 75 controls a valve in the unit 76, the valve being associated with a hunting gear so that the off-set of the valve from a zero position causes a power output shaft 77 of the unit to operate and, incidentally, to tend to restore the valve to a zero setting. With a hydraulic pump and motor unit as described, there will be a certain amount of lag in the hydraulic system due to the hunting gear. To overcome the difficulties due to lag in this particular instance, the shaft 75 is geared to a shaft 78 which is, in turn, geared to a shaft 79 carrying one member 80 of a differential gear 81. The power output shaft 77 is in like manner geared to a shaft 82 which is also geared to one side of the differential gear 81. The member 83 carrying the planet wheels of the differential gear is connected with a gearwheel 84 meshing with a further gearwheel 85 carried upon a shaft 86. The latter communicates its mechanical drive to a shaft 87 to which there is secured a worm 88 meshing with a worm ring 89 secured to the outer casing of the fine receiver 44. With the arrangement of the differential gear 81 as described, it will be seen that one side of the differential gear receives a movement corresponding to the power output 77, whereas the other side of the differential gear receives a movement corresponding to that of the input shaft 75. Any difference between the movements of the shaft 75 and 77 will be shown by a movement of the member 83 of the differential gear. Any movement of such member 83 of the differential gear will be communicated by the shafts 86 and 87 to the fine receiver 44. The latter will, therefore, be advanced a distance corresponding to the lag which is due to the hydraulic unit 76, thereby effecting compensation. The shaft 77 is shown diagrammatically as driving a gun mounting 90, and may produce either a training or elevating movement therein. There is a mechanical brake (not shown) associated with the shaft 75 driving into the hydraulic pump and motor power amplifier unit 76 so as to damp the movement of the shaft 75.

In Figure 3 of the drawings, an electrical circuit is shown corresponding to the electric power amplifier unit 57.

The photo-electric cells 52 are indicated at 91 and the photo-electric cells associated with the photo-electric device of the coarse receiver 43 are indicated at 92. All the photo-electric cells 91 and 92 are disposed across a pair of common leads 93 and 94, which it will be observed are supplied from a rectifying unit consisting of the transformer 95 and rectifying valve 96, together with suitable smoothing condensers 97 and a choke 98. Feeding resistances are included in the parallel connections to each photo-electric cell. The photo-electric cells 91 each have connections 99 and 100 with the grids 101 and 102 of thermionic valves 103 and 104. Transformers 105 and 106 are associated with each connection 99 and 100 and there are also means for introducing D. C. grid bias upon the grids 101 and 102 indicated by grid batteries 107 and 108 which may, of course, be replaced by equivalent supply systems not involving the use of batteries. The transformers 105 and 106 introduce upon the grids of their respective valves alternating potentials which, in conjunction with the bias supplies 107 and 108, determine when the valves concerned shall become effective depending, of course, upon the amount of light falling upon the photo-electric elements 91. A supply transformer 109 is arranged with a tapped secondary and supplies the plate current to the valves 103 and 104 in such manner that the alternating plate potentials of the two valves are 180° out of phase. The plate supply lead of each valve includes a transformer 110 and 111, the secondaries of which are connected to a further pair of valves 112 and 113. The secondary of the transformer 111 is connected by leads 114 to the valve 112 one to the grid and one to the cathode thereof. The secondary of the transformer 110 is connected to the valve 113, by leads 115 in like manner, but it will be observed that the valves 112 and 113 are in reverse positions so that the output connections 116 therefrom will carry current either in one direction if, say, the one valve 112 is operating or in the other direction when the other valve 113 is operating. The output 116 is connected with the armature of the motor 58 whereby the armature current thereof is determined according to the energisation of the photo-electric cells 91.

From the description above, it will be seen that if one photo-electric cell 91 is energised by a beam of light falling upon it, then the corresponding valve 103, for example, takes control and the impulse thereof will be communicated by the transformer 110 to the grid of the valve 113, whereupon the latter will supply output current upon the output connections 116 and therefore to the armature of the motor 58. If the other photo-electric cell 91 is energised, an opposite current will be supplied to the armature of the motor 58.

Each of the photo-electric cells 92 has a connection 117 to the control grid of an associated pentode valve 118. In the plate circuit of each valve there is arranged a relay winding 119 each of which is adapted to co-operate with a relay switch 120. Thus, should light fall upon either of the photo-electric cells 92, then the associated pentode valve 118 will operate and the relay winding 119 will cause its associated relay switch 120 to be opened. This causes opening of the corresponding grid connection of one of the valves 112 and 113 so that the particular valve in question is fully operative and maintains a maximum output until its grid circuit is once more closed. Thus, irrespective of the action of the photo-electric cells 91, should a cell 92 of the coarse control be in operation then such coarse control photo-electric cells will over-ride the effect of the fine control cells and will produce maximum operating current in the armature of the motor 58.

The field of the motor 58 is formed by a winding 121 located in the output circuit 122 of a thermionic valve 123. The latter is of the same type as the valves 112 and 113 and has a control grid 124 which is connected to a transformer 125 and relay switches 126. The relay switches are opened when the relay windings 119 are energised so that the grid circuit of the valve 123 is opened and it is fully operative to produce maximum current through the field winding 121 associated with the motor 58.

The photo-electric cell 61 is effectively connected to the grid of a pentode valve 127 which is choke capacity coupled to a power triode valve 128, the output of which is fed through a transformer 129 to a full-wave rectifying valve 130. In the output from the valve 130 there are smoothing elements consisting of a choke 131 and condensers 132. A loading resistance 133 is connected across the smoothed D. C. output from the rectifying valve 130, and across this loading resistance 133 the grid and cathode of the valve 123 are connected.

When the apparatus is in operation, the photo-electric cell 61 will periodically receive light, so that electrical impulses of a corresponding frequency will be produced thereby. The characteristic of the valve system associated with the photo-electric cell 61 is such as to give an amplification proportional to the frequency of the impulses from the photo-electric cell 61. Thus, the D. C. potential across the loading resistance 133 is proportional to the frequency of the light impulses falling on the photo-electric cell 61. Therefore, assuming that the relay switches 126 are both closed, the plate current of the valve 123 will be proportional to the frequency of the light impulses falling upon the photo-electric cell 61 which frequency is proportional to the speed of operation of the fine receiver.

It will be apparent from the foregoing that the relay switches 120 and 126 are normally closed, but are adapted to be opened by the coils 119. As long as these switches are closed, the grids of the valves 112 and 113 are controlled by valves 103 and 104, and in turn by the cells 91 of Figure 3, which correspond to the cells 52 of Figure 2.

The supply circuit to the motor 58 comprises the lead 116 and one or the other of the valves 112 or 113. This circuit is always completed, but the amount of current passing through the armature is controlled by the grids of valves 112 or 113.

Similarly, the field supply is taken from the lead 116 through lead 122 and valve 123 and is always completed, but the amount of current is controlled by the grid of the valve 123 according to the potential across the resistance 133, which in turn depends on the cell 61. In view of valves 127 and 128, transformer 129, and rectifier 130, this control potential is a non-pulsating D. C. potential which is proportional to the frequency of pulsations produced by the cell 61.

The above conditions exist for the fine control. Now it is clear that the fine and coarse receivers 44 and 43 and their screens 48 and 66 rotate simultaneously but at different rates. The screen 48 rotates faster than the screen 66 and consequently uncovers one of the cells 52 (91 in Fig. 3) before the screen 66 uncovers one of the cells of the photo-electric device 45 (92 in Fig. 3). Under such conditions the fine control only is effective, the coarse control being inoperative. The fine control starts the operation of the hydraulic motor with the result that the active cell 52 (91) and the inactive cell (92) follow their respective screens. It should be clear that if the telescope 33 is moved slowly, the lag of the cells behind their screen will be small and the coarse control may never come into operation, even though the fine control screen 48 makes one or any number of complete revolutions.

On the other hand, if the telescope 33 is moved rapidly through a large angle, the fine control will first come into operation, but the screen 66 of the coarse control will advance far enough relative to the associated photo-electric cells to uncover one of them. When that happens, one or other of the coils 119 is energized through operation of the associated cell 92 to cause one of the relay switches 120 in the grid circuit of valve 112 or 113 to be opened and one of the relay switches 126 in the grid circuit of the valve 123 to be opened.

The activation of cell 92 does not complete the motor circuit, this circuit remaining just as it was except that the valves are no longer controlled by their grids. The result is that these valves "fire fully," i. e. operate without grid control, and maximum current passes to the armature and field. The photo-electric units follow up their respective screens rapidly, and as soon as cell 92 is again screened, the switches 120 and 126 close and the fine control takes over as before.

The above does, of course, represent only one constructional form of the invention and others may be devised. It may be seen that the motor 58 may be controlled so that its armature current is dependent upon the speed of operation of the receiver, whilst its field is changed in direction according to the energization of the one or the other of the photo-electric units 52. It will also be appreciated that in a simpler form of the apparatus in accordance with the invention, the coarse system might be omitted. The lag correction achieved with the aid of the differential gear 81 may be obtained in other ways and other constructional variations may be made, for example, in the photo-electric device.

In the above, and in the appended claims, reference has been made to a "director." It will be understood that this term is intended to refer to any kind of controller or movement initiating member, whether manual or automatic.

What we claim and desire to secure by Letters Patent of the United States is:

1. In gun-fire control or like apparatus for the transmisison and power amplification of measured displacements from a director to an object being controlled thereby, electrical remote control means responsive to movements of said director including transmitting means operable by the director, receiving means electrically coupled to and movable in synchronism with said transmitting means, photo-electric means associated with said receiving means comprising photo-electric elements, shielding means common to said elements operable to expose one of said photo-electric elements to exciting radiation when moved in one direction and to expose another of said photo-electric elements when moved in the other direction, an electric follow-up motor associated with said photo-electric means and rotated in one direction or the other depending upon whether the one or the other of the photo-electric elements is energized, a connection between said photo-electric means and said follow-up motor to move the photo-electric means to shielded relationship, and a hydraulic pump and motor unit driven from said follow-up motor and drivably connected to the object being controlled.

2. Apparatus as claimed in claim 1, wherein the photo-electric means comprises a driven and a following member, one of such members carrying a pair of photo-electric elements and the other carrying the shielding means, said exciting radiation comprising a source of light normally shielded by said shielding means, and means operatively connecting said follow-up motor to said following member.

3. In a gun-fire control or like apparatus for the transmission and power amplification of measured displacements from a director to an object being controlled thereby, a "fine" transmitter and a "coarse" transmitter operable by said director, said transmitters being so coupled that for one revolution of the "coarse" transmitter the "fine" transmitter makes several revolutions, a "fine" receiver and a "coarse" receiver, means connecting the 'fine" and "coarse" transmitters to the "fine" and "coarse" receivers so that the "fine" receiver rotates in unison with the "fine" transmitter and the "coarse" receiver in unison with the "coarse" transmitter, a photoelectric device associated with each receiver, each of said photo-electric devices embodying two photo-electric elements and shielding means for said elements operable to expose one of the appropriate pair thereof to exciting radiation when moved in one direction and to expose the other element of the same pair when moved in the other direction, an electric follow-up motor, connections between said photo-electric devices and said follow-up motor to move said devices to shielded relationship, said photo-electric devices being coupled with the follow-up motor with the same velocity ratio as the coupling between the "fine" and "coarse" transmitters, an electric amplifier connected to said photo-electric devices and including amplifying thermionic valve circuits to develop an output current in one direction when one of the photo-electric elements of one of said devices is excited and an output current in the other direction when the other photo-electric element of said device is excited, and connections for supplying the developed current from said amplifier to the follow-up motor.

4. In a gun-fire control or like apparatus for the transmission and power amplification of measured displacements from a director to an object being controlled thereby, a "fine" transmitter and a "coarse" transmitter operable by said director, said transmitters being so coupled that for one revolution of the "coarse" transmitter the "fine" transmitter makes several revolutions, a "fine" receiver and a "coarse" receiver, means connecting the "fine" and "coarse" transmitters to the "fine" and "coarse" receivers so that the "fine" receiver rotates in unison with the "fine" transmitter and the "coarse" receiver in unison with the "coarse" transmitter, a photoelectric device associated with each receiver, each of said photo-electric devices embodying two photo-electric elements and shielding means for said elements operable to expose one of the appropriate pair thereof to exciting radiation when moved in one direction and to expose the other element of the same pair when moved in the other direction, an electric follow-up motor, connections between said photo-electric devices and said follow-up motor to move said devices to shielded relationship, said photo-electric devices being coupled with the follow-up motor with the same velocity ratio as the coupling between the "fine" and "coarse" transmitters, an amplifier having its output circuit connected to said follow-up motor, means electrically connecting the photo-electric devices to the amplifier so constructed and arranged that when one of the photo-electric elements of one of the devices is energized an amplified current flows in the armature of the motor in a particular direction and when the cooperating photo-electric elements of said device is energized the armature current flows in the opposite direction, a hydraulic pump and motor unit controlled by the follow-up motor and drivably connected to the object being controlled, and means to transmit to the "fine" receiver from the hydraulic pump and motor unit advancing movement corresponding to lag in the hydraulic pump and motor unit.

5. Apparatus as claimed in claim 1, including a speed responsive device associated with the photo-electric means and operative to introduce a component of control into the follow-up motor dependent upon the rate of movement thereof.

6. Apparatus as claimed in claim 3, including a speed responsive device connected to the photo-electric device of the "fine" receiver comprising a source of light, a photo-electric cell, a slotted screen so disposed between said source of light and said photo-electric cell that the slots therein permit intermittent energization of said photo-electric cell with a frequency depending upon the speed of operation of the director, and means connecting said photo-electric cell through the amplifier to said follow-up motor to influence the torque thereof according to its frequency of excitation.

7. Apparatus as claimed in claim 4, wherein the means connecting the photo-electric devices to the amplifier comprise thermionic valve circuits including the photo-electric elements associated with the "fine" and "coarse" receivers, and means to override the effect of the fine thermionic valve circuits when the photo-electric elements of the "coarse" receiver are excited.

8. Apparatus as claimed in claim 1, wherein the hydraulic pump and motor unit controlled by the follow-up motor comprises an input control shaft and a power output shaft and a differential gear mechanically connected at either side to said input and output shafts, said gear having a middle member which records any relative displacement between the input and output sides of the hydraulic pump and motor unit and is connected to impart a corrective movement to said receiving means.

THOMAS FREDERICK CLARKE,
PERCY WILLIAM COLE,
Executors of the Estate of Maurice Kerr Ingoldby, Deceased.
JOHANN HERMANN ABBINK-SPAINK.

REFERENCES CITED

The following references are of record in the file of this patent:

UNITED STATES PATENTS

| Number | Name | Date |
|---|---|---|
| 1,957,240 | Young | May 1, 1934 |
| 2,126,887 | Hodgman et al. | Aug. 16, 1938 |
| 2,189,823 | Vickers et al. | Feb. 13, 1940 |
| 2,191,792 | Hill | Feb. 27, 1940 |